United States Patent
Jensen et al.

(10) Patent No.: US 6,869,669 B2
(45) Date of Patent: Mar. 22, 2005

(54) FIBER-REINFORCED SANDWICH PANEL

(75) Inventors: Michael S. Jensen, Chula Vista, CA (US); Kurt S. Martin, La Jolla, CA (US)

(73) Assignee: Advanced Wall Systems LLC, Chula Vista, CA (US)

(*) Notice: Subject to any disclaimer, the term of this patent is extended or adjusted under 35 U.S.C. 154(b) by 144 days.

(21) Appl. No.: 09/993,374

(22) Filed: Nov. 14, 2001

(65) Prior Publication Data

US 2003/0091805 A1 May 15, 2003

(51) Int. Cl.[7] .............................. B32B 13/02; E04B 5/18; E04C 1/00
(52) U.S. Cl. .................... 428/294.7; 428/113; 428/114; 428/141; 428/292.1; 52/309.7; 52/309.8; 52/319; 52/602; 52/782.1
(58) Field of Search .................... 428/292.1, 297.4, 428/113, 114, 144, 141; 52/319, 309.7, 309.8, 602, 782.1, 125

(56) References Cited

U.S. PATENT DOCUMENTS

| | | | |
|---|---|---|---|
| 1,559,749 A | 11/1925 | Hall | |
| 1,773,168 A | 8/1930 | Brostrom | |
| 3,775,916 A | * 12/1973 | Bair | 52/125.4 |
| 3,976,741 A | * 8/1976 | Lowe et al. | 264/256 |
| 4,299,059 A | * 11/1981 | Smith | 49/401 |
| 4,357,384 A | * 11/1982 | Jasperson | 428/215 |
| 4,516,371 A | * 5/1985 | Simpson | 52/269 |
| 4,530,648 A | * 7/1985 | Phillips | 425/65 |
| 4,542,613 A | 9/1985 | Leyte-Vidal | |
| 4,617,219 A | * 10/1986 | Schupack | 428/113 |
| 4,620,404 A | * 11/1986 | Rizk | 52/602 |
| 4,774,794 A | * 10/1988 | Grieb | 52/309.7 |
| 5,826,389 A | * 10/1998 | Siler | 52/309.1 |
| 6,101,779 A | * 8/2000 | Davenport | 52/602 |
| 6,112,489 A | 9/2000 | Zweig | |
| 6,141,929 A | 11/2000 | Kistner et al. | |
| 6,202,375 B1 | 3/2001 | Kleinschmidt | |

* cited by examiner

Primary Examiner—Rena Dye
Assistant Examiner—Camie S Thompson
(74) Attorney, Agent, or Firm—Gary M. Nath; Marvin C. Berkowtiz; Derek Richmond

(57) ABSTRACT

The present invention may be embodied in a sandwich panel having first and second face panels each having a first predetermined thickness and being formed of a fiber-reinforced cementitious material. The sandwich panel further includes support frame for supporting the first and second face panels in a spaced apart configuration. The support frame is formed of a fiber-reinforced cementitious material that is continuous with the cementitious material of the first and second face panels. Blocks of rigid insulation are embedded in the sandwich panel for defining a structure of the support frame.

14 Claims, 3 Drawing Sheets

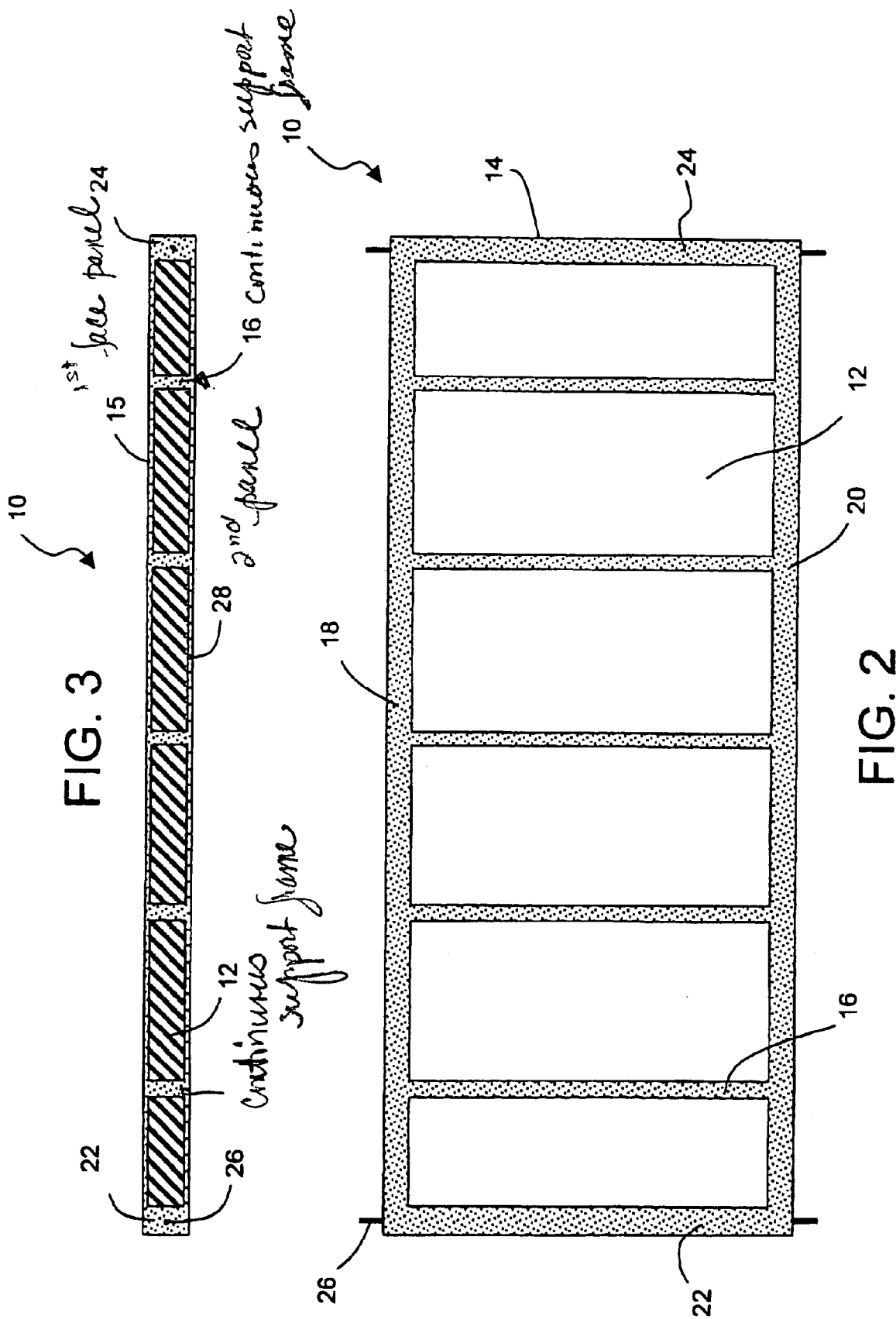

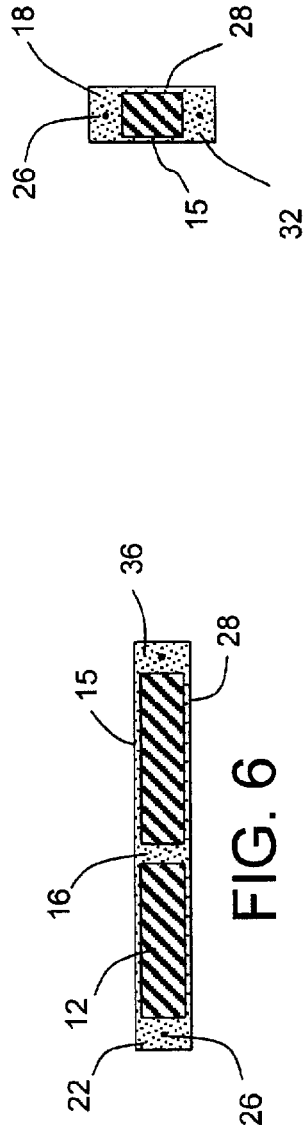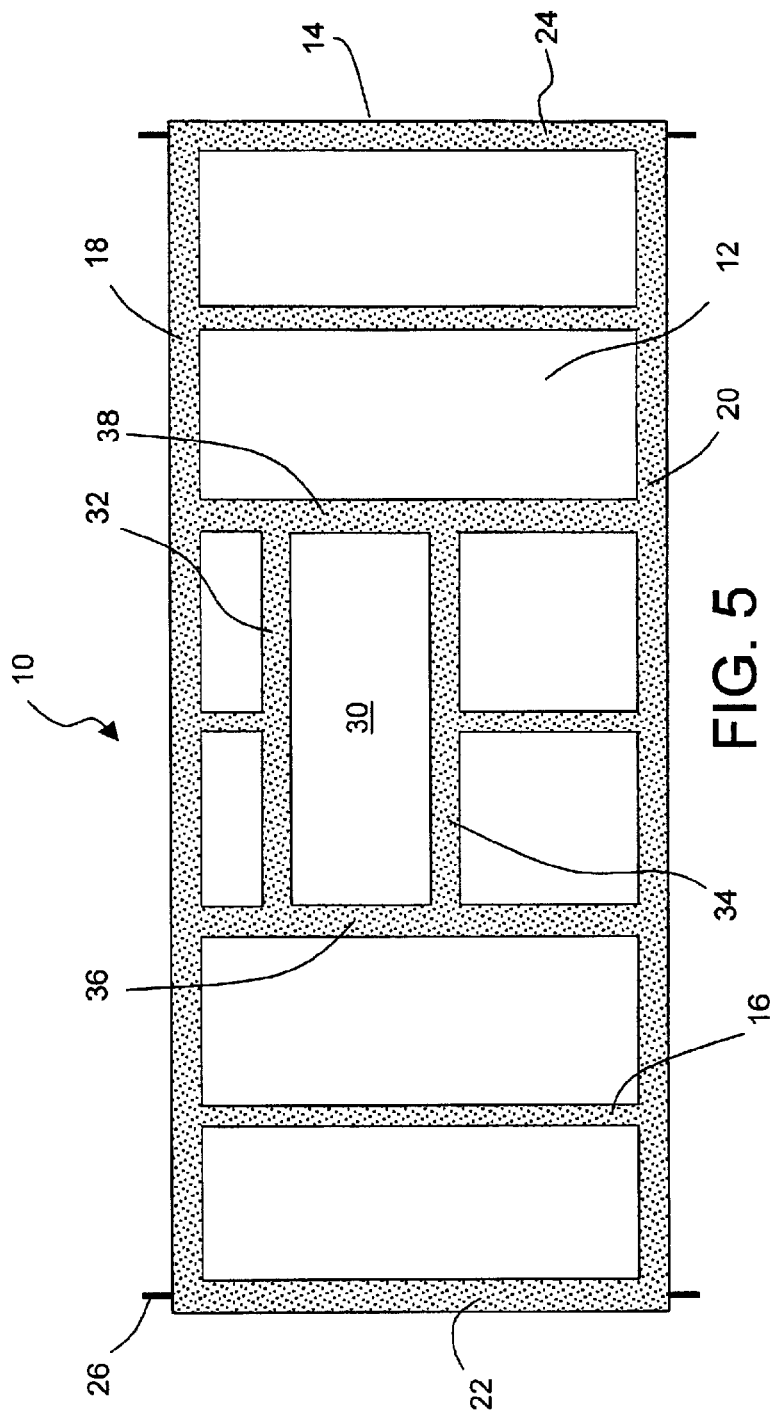

US 6,869,669 B2

FIBER-REINFORCED SANDWICH PANEL

BACKGROUND OF THE INVENTION

1. Field of the Invention

The present invention relates to prefabricated structures, and more particularly, to fiber-reinforced sandwich panels for ease of manufacture of prefabricated structures.

2. Description of the Prior Art

Concrete is a preferred building material for construction of structures in certain markets. Load-bearing concrete walls are generally thick, heavy, and difficult to transport. Also, an un-insulated concrete wall generally has a poor insulation value and increasing the insulation value of the concrete wall may be problematic. Accordingly, a prefabricated structure manufactured using concrete may not be economically viable in certain markets.

Accordingly, there exists a need for a lightweight and relatively low-cost prefabricated structure for competing in markets preferring concrete structures. The present invention satisfies these needs.

SUMMARY OF THE INVENTION

The present invention is embodied in a fiber-reinforced sandwich panel and a unique composition for the manufacture of prefabricated buildings. The sandwich panel includes first and second face panels, a support frame, and embedded insulation. Each of the first and second face panel has a first predetermined thickness and is formed of a fiber-reinforced cementitious material. The support frame supports the first and second face panels in a spaced apart configuration. The support frame is formed of a fiber-reinforced cementitious material that is continuous with the cementitious material of the first and second face panels. The block of embedded insulation defines a structure of the support frame.

In more detailed features of the invention, the sandwich panel may have a height greater than 6 feet, a width greater than about 8 feet, and a thickness between about 3.5 and 5 inches. The thickness of the first panel may be between about 0.375 inches and 1.0 inch, and the thickness of the second panel likewise may be between about 0.375 inches and 1.0 inch. The support frame may have an upper border beam, a lower border beam, and first and second border beams that encompass the insulation. The support frame may further include one or more ribs that have a length extending between the lower border beam and the upper border beam, and that are substantially parallel with the first and second end beams. The ribs may couple the first and second face panels along the length of the ribs. Each of the beams may have a width of about 4 inches, and each of the ribs may have a width of about 2.5 inches. Also, each border beam may be further strengthened by reinforcing bar. The insulation block may be rigid. The cementitious material may have a composition, by weight before cure, of about 42.3% cement, about 42.3% sand, about 1.0% polypropylene fiber, about 0.1% superplasticiser and about 14.3% water.

In other more detailed features of the invention, the sandwich panel may include an opening formed by first and second jamb beams that extend between the lower border beam and the upper border beam, and by a sill beam and a header beam that each extend between the first and second jamb beams. The first and second jamb beams are substantially parallel with the first and second end beams and the sill beam and the header beam are each substantially parallel with the lower and upper border beams.

BRIEF DESCRIPTION OF THE DRAWINGS

The accompanying drawings illustrate embodiments of the present invention and, together with the description, serve to explain the principles of the invention.

FIG. 2 is a cross-sectional elevation view of the fiber-reinforced sandwich panel of FIG. 1, showing a frame structure behind a face panel.

FIG. 3 is a cross-sectional plan view of the fiber-reinforced sandwich panel of FIG. 1.

FIG. 5 is a cross-sectional elevation view of the fiber-reinforced sandwich panel of FIG. 4, showing a frame structure behind a face panel.

FIG. 6 is a cross-sectional plan view of the fiber-reinforced sandwich panel of FIG. 4, showing a jamb of the opening.

FIG. 7 is a cross-sectional elevation view of the windowed fiber-reinforced sandwich panel of FIG. 4, showing a header of the opening.

DETAILED DESCRIPTION

Figure 1:
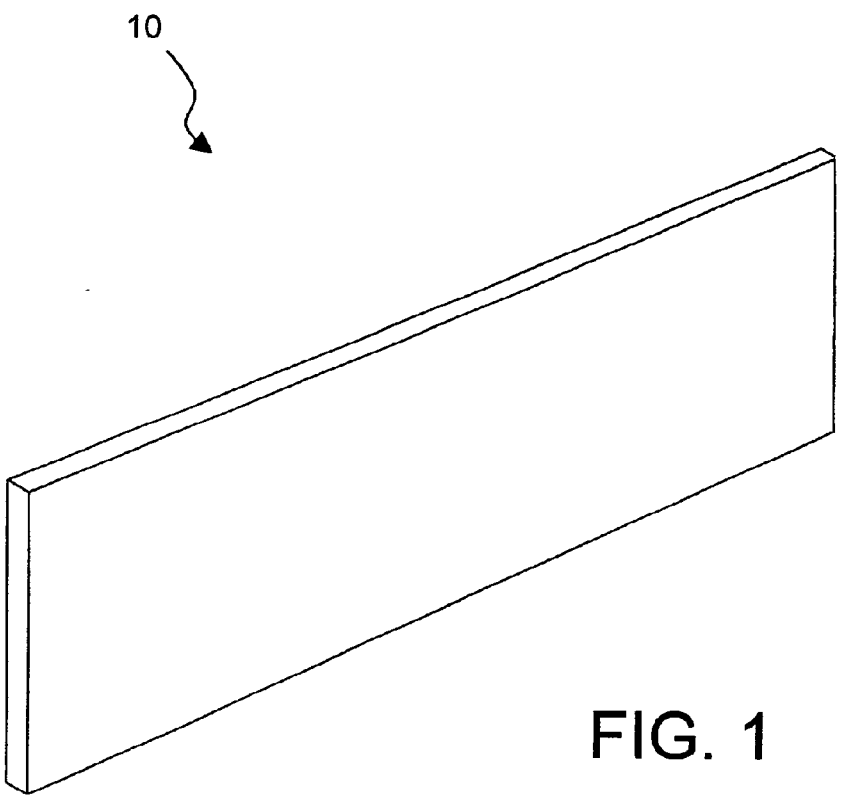
FIG. 1 is a perspective view of a fiber-reinforced sandwich panel, according to the present invention.
Figure 4:
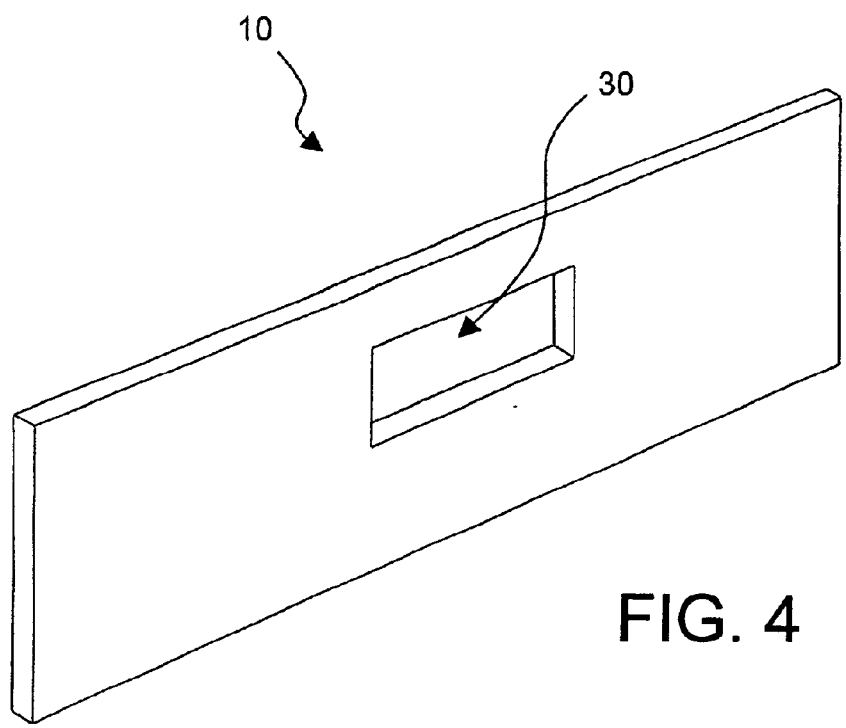
FIG. 4 is a perspective view of a fiber-reinforced sandwich panel having an opening, according to the present invention.

With reference to FIGS. 1–3, the present invention resides in a fiber-reinforced sandwich panel 10 having a lightweight and cost-effective construction. The sandwich panel is formed of a unique cementitious material that allows it to be insect resistant and generally impervious to moisture. Rigid blocks 12 of insulation are embedded in the sandwich panel to provide a desired insulation value to the sandwich panel and to define a support frame 14 that meets desired structural parameters for the sandwich panel.

The sandwich panel 10 may be constructed by pouring a first layer of the cementitious material into a mold (not shown) for forming a casting face panel 15. The rigid insulation blocks 12 are then placed on the first layer. The blocks are sized to define the size of ribs 16 between the blocks and border beams, 18, 20, 22 and 24, around the edge of the sandwich panel. Small nylon spacers (not shown) are placed between the mold and the insulation blocks to define the thickness of the casting face panel. Reinforcing bars 26 may be placed in the spaces for the border beams that surround the insulation blocks for adding structural strength to the border beams and the sandwich panel. The rebar may extend a few inches outside of the sandwich panel to assist in handling the sandwich panel and for attaching the panel to other structural members. The ribs extend between the upper border beam 18 and the lower border beam 20 and are substantially parallel with the border beams, 22 and 24, at the ends of the sandwich panel. The ribs provide support to the face panels, 15 and 28, and assist in the load bearing characteristics of the sandwich panel.

After placement of the insulation blocks 12 on the first layer, additional cementitious material is poured between, surrounding, and over the blocks to form the border beams, 18, 20, 22 and 24, and the ribs 16. The cementitious material that is poured above the blocks forms an upside face panel 28. Accordingly, the cementitious material forms the face panels 15 and 28, and the support frame 14. After the sandwich panel has initially cured, it is removed from the mold.

The sandwich panel 10 may have a wide variety of configurations for the size of the beams, 18, 20, 22 and 24, the width and spacing of the ribs 16, and the thickness of the casting face 15 and upside face panel 28. A representative sandwich panel may have a width of 16 feet (ft.), a height of 10 ft., and a thickness of 4.25 inches (in.). In conjunction with the sandwich panel thickness of 4.25 in., the beams each may have a width of 4 in., and the ribs may each have a width of 2.5 in. The spacing between the first end border beam 22 and the first adjacent rib of the wall panel may be 18 in. Similarly, the spacing between the second end border beam 24 and the first adjacent rib may be 18 in. The spacing between the ribs may be 26 in on center.

The cementitious material is reinforced using glass, synthetic, or similar fibers, to provide added structural strength to the sandwich panel 10. A representative composition by weight (uncured) for the cementitious material is provided by the following table:

TABLE 1

| (% by weight - uncured) | Preferred |
|---|---|
| Cement | 42.31% |
| Sand | 42.31% |
| Polyfiber | 0.95% |
| Superplasticizer | 0.13% |
| Water | 14.30% |

The polyfiber may be polypropylene fiber cut to lengths of about 0.5 in. to 1.5 in. before mixing with the other materials. The superplasticiser may be Rheobuild® 3000FC, available from Master Builders, Inc. or Cleveland, Ohio. Other formulations for the cementitious material are described in U.S. Pat. No. 6,073,410, titled STRUCTURE AND FORMULATION FOR MANUFACTURE OF PREFABRICATED BUILDINGS. U.S. Pat. No. 6,073,410 is incorporated herein by reference. A polymer may be added to the mix or sprayed on the poured sandwich panel 10 to assist hydration of the cementitious material during cure under low humidity conditions or to enable early handling of the panel. Under controlled environmental conditions, the polymer may be eliminated.

With reference to FIGS. 4–7, the fiber-reinforced sandwich panel 10 of the invention may have an opening 30 for a window or similar passage. As shown in FIG. 5, the opening is surrounded by a header beam 32, a sill beam 34, and first and second jamb beams, 36 and 38. The first and second jamb beams provide support for the upper border beam 18, the header beam 32, and the sill beam 34. Further, the first and second jamb beams, the header beam, and the sill beam may be reinforced with bars 26 to provide additional structural strength surrounding the opening in the sandwich panel.

A representative sandwich panel 10 with an opening 30 may have height of 10 ft., a width of 16 ft., and a thickness of 4.625 in. The casting face panel 15 and the upside face panel 28 may each have a thickness of 0.625 in. The opening in the sandwich panel may have a width of 8 ft. and a height of 4 ft., with the bottom of the opening being 2.5 ft. the from the bottom of the sandwich panel. Each rib 16 may have a thickness of 2.5 in. and may be spaced between the respective end border beam, 22 or 24, and respective jamb beam, 36 or 38, by 24 in.

The fiber-reinforced cementitious material allows the relatively thin casting face panel and upside face panel 28 to have a relatively high strength. The insulation blocks 12 provide a high insulation value to the sandwich panel 10.

The sandwich panel has an appearance and impression similar to that of a concrete structure. The configuration of the beams and ribs, and the placement of the reinforcing in the beams, allows the frame 14 of the sandwich panel to have sufficient load-bearing capacity to support a roof structure, additional floor level, or the like. Accordingly, the fiber-reinforced sandwich panel of the present invention provides a cost-effective and relatively lightweight, insulated panel for the construction of prefabricated structures or the like.

While the invention has been illustrated and described in detail in the drawings and foregoing description, it should be understood the invention may be implemented though alternative embodiments within the spirit of the invention. Thus, the scope of the invention is not intended to be limited to the illustration and description in this specification, but is to be defined by the appended claims.

We Claim:

1. A sandwich panel, comprising:
   a first face panel having a first predetermined thickness and being formed of a fiber-reinforced cementitious material;
   a second face panel having a second predetermined thickness and being formed of the same fiber-reinforced cementitious material as the first face panel;
   a support frame for supporting the first and second face panels in a spaced apart configuration, the support frame being formed of the same fiber-reinforced cementitious material and being continuous with the cementitious material of the first and second face panels and disposed therebetween; and
   an insulation material embedded in the sandwich panel that defines a structure of the support frame.

2. A sandwich panel as defined in claim 1, wherein the first predetermined thickness is between about 0.375 inches and 1.0 inches and the second predetermined thickness is between about 0.375 inches and 1.0 inches.

3. A sandwich panel as defined in claim 2, wherein the sandwich panel has a height greater than 6 feet, a width greater than about 8 feet, and a thickness between about 3.5 and 5 inches.

4. A sandwich panel as defined in claim 1, wherein the support frame comprises an upper border beam, a lower border beam, and first and second border beams that encompass the insulation material.

5. A sandwich panel as defined in claim 4, wherein the support frame comprises one or more ribs having a length extending between the lower border beam and the upper border beam, and being substantially parallel with the first and second end beams, and coupling the first and second face panels along the length of the ribs.

6. A sandwich panel as defined in claim 5, wherein the sandwich panel has a thickness between about 4.5 inches, the beams each have a width of about 4 inches, and the ribs each have a width of about 2.5 inches.

7. A sandwich panel as defined in claim 4, wherein each border beam is strengthened by a reinforcing bar.

8. A sandwich panel as defined in claim 4, wherein the sandwich panel includes an opening formed by first and second jamb beams extending between the lower border beam and the upper border beam, and being substantially parallel with the first and second end beams, by a sill beam extending between the first and second jamb beams and being substantially parallel with the lower and upper border beams, and by a header beam extending between the first and jamb beams and being substantially parallel with the lower and upper border beams.

9. A sandwich panel as defined in claim 8, wherein each beam is strengthened by a reinforcing bar.

10. A sandwich panel as defined in claim 1, wherein the insulation material comprises at least one rigid block of insulation.

11. A sandwich panel as defined in claim 1, wherein the cementitious material has a composition, by weight before cure, of about 42.3% cement, about 42.3% sand, about 1.0% polypropylene fiber, about 0.1% superplasticiser and about 14.3% water.

12. A method of making a sandwich panel comprising the steps of:

pouring a first portion of a fiber-reinforced cementitious material into a mold for forming a first face panel;

placing a rigid insulation block on a side of the cementitious material of the first face panel opposite the mold;

pouring a second portion of the same fiber-reinforced cementitious material around the rigid insulation block such that the second portion of cementitious material forms one of a border beam and a support frame therearound, and is continuous with the first portion of cementitious material; and pouring a third portion of the same fiber-reinforced cementitious material into the mold over the rigid insulation block and the second portion for forming a second face panel such that the third portion of fiber-reinforced cementitious material is continuous with the first and second portions.

13. The method as claimed in claim 12 further comprising the step of placing reinforcing bars in the border beams while forming the border beams.

14. The method as claimed in claim 12 further comprising the step of placing spacers between the mold and the insulation blocks to define predetermined thicknesses of the first and second face panels.

* * * * *